United States Patent Office

3,741,771
Patented June 26, 1973

3,741,771
WATER-SOLUBLE PROTEIN MATERIALS
Akiva Pour-El, St. Paul, and Thomas C. Swenson, Minneapolis, Minn., assignors to Archer Daniels Midland Company, Decatur, Ill.
No Drawing. Continuation-in-part of application Ser. No. 797,669, Feb. 7, 1969. This application Sept. 10, 1970, Ser. No. 71,254
The portion of the term of the patent subsequent to Jan. 30, 1990, has been disclaimed
Int. Cl. A23j *1/14*; A23l *1/00*
U.S. Cl. 99—79                      13 Claims

ABSTRACT OF THE DISCLOSURE

Dispersed plant proteins are digested with an acid active enzyme at a pH below 4.6. Quiescent conditions are maintained in the reaction medium and digestion proceeds until the insoluble colloidal protein is substantially completely dissolved. The pH is raised to about 4.6 and the medium is allowed to stand causing additional insoluble protein to precipitate. The insoluble residue is removed and the soluble protein material is dried. A clear liquid, which can be carbonated, is formed containing the solubilized protein material at a pH corresponding to the isoelectric point of the protein.

---

This application is a continuation-in-part of our prior copending application Ser. No. 797,669, filed Feb. 7, 1969 and now abandoned in favor of continuation case Ser. No. 203,443, filed Nov. 30, 1971, now U.S. Pat. 3,713,843.

This invention relates to acid soluble proteins and particularly to water soluble plant proteins which are adapted for use in liquids at the pH corresponding to the isoelectric point of the starting materials. Particularly significant embodiments of the invention relate to beverages which contain a modified soybean protein in clear solution.

Many efforts have been made in the recent years to develop high protein food materials which are adapted for specific nutritional aims. Particularly pertinent among these developments are the so-called "health" foods which are adapted to reduce the consumption of carbohydrates while maintaining the nutritional value of the products consumed. One particular problem with these solutions is that proteins which are used to supply the required nutritional values are generally insoluble or only partially soluble in the beverages as marketed. Since the consumer generally requires not only a product which is nutritionally acceptable, but one which is aesthetically acceptable, it has been desirable to produce beverages in the form of clear solutions. Thus, the consumer is attracted by the combined nutritional value of the product and the clean, clear appearance of the product. For reasons other than consumer attraction, it is also desirable to have clear solutions for ease in packaging. Processing equipment can be adapted much more readily to handle solutions than to handle dispersions or emulsions since the latter tend to form sediments which clog flow lines and pumps.

In the past, proteins have not been adapted for use in liquids having acid pH since they do not completely dissolve to form sparkling clear aqueous solutions at acid pH especially at the pH of their isoelectric point. Simple proteins, e.g. globulins, are insoluble in aqueous solutions and even the relatively soluble secondary and primary digestion products of simple proteins, e.g. proteoses and peptones, do not dissolve enough to give clear solutions. Additionally, proteins vary in their solubility characteristics. Generally, proteins are least soluble at their isoelectric point which is the pH at which proteins are electrically neutral. As the pH is changed from the isoelectric point to more acid or more alkaline values, the protein becomes relatively more soluble. This is true of the generally insoluble plant globulins (simple proteins) and of the relatively soluble peptones and proteoses, etc. (primary and secondary split-products). The increased solubility at acid or alkaline pH is generally thought to be caused by the formation of proteinates or protein-salts which are soluble salts of proteins formed by the reaction of the ionizable groups in the protein molecule with ions produced by the base or acid, respectively. However, it will be apparent that since the cationic content of the protein is generally low, it has not been possible to obtain substantially complete solubility of the protein by adjusting the pH. It is further apparent that extremely acid or extremely basic solutions are not adapted for consumption. Thus, even though conversion of plant globulins to lower derivatives generally increases the protein solubility and even though decreasing pH further increases solubility, it has not been possible to produce sparkling clear solutions of proteins at pH's especially in the range of their isoelectric points since the increased solubility is not adequate and since proteins are difficult to dissolve due to physical parameters.

In the prior art production of acid soluble protein there is usually a step in which the protein solution is kept in the cold at the pH of digestion to precipitate all the larger insoluble protein molecules prior to filtration of the digested protein. However, the resulting products were also insoluble or only partially soluble and this "winterization" required long periods.

Accordingly, it is the primary object of the present invention to provide a protein which is adapted for forming sparkling clear solutions at acid pH's.

Another object is to provide a process for forming the acid-soluble proteins from plant globulins, particularly from soybean protein.

Still another object is to provide a process for forming acid soluble protein by reacting an insoluble protein with an acid active enzyme at acid pH followed by a chemical winterization step achieved in less time.

Still another object is to provide a process which is comprised of treating an insoluble plant protein at a pH of about 3 followed by raising the pH to about 4.6 for 1–6 hours at 0° C. room temperature.

Yet another object of the invention is to provide a beverage which is adapted to have an acid pH and to contain in a sparkling clear solution up to 20% of a modified plant globulin.

Still another object is to provide a process for converting insoluble soybean proteins into a substantially completely acid soluble protein with greater ease of dissolution.

These objects are accomplished in accordance with the present invention by treating a dispersed plant globulin with an acid active enzyme at acid pH with controlled agitation wherein the enzyme digests the plant proteins in colloidal suspension and produces a protein which is approximately 100% soluble in the reaction medium and wherein the pH of the reaction medium is then raised to about 4.6 by adding a basic medium for 1–6 hours at 0° C. to room temperatures. The invention thus involves a proteolysis performed at a specific pH range followed by a chemical winterization at pH 4.6.

It will thus be seen that the present invention provides a method for treating the simple proteins (globulins) with enzymes to digest such simple proteins and form the primary and secondary split-product derivatives thereof. These derivatives are proteins of a less complex nature and their digested products, which upon digestion by alimentary enzymes, will yield amino acids adapted for assimilation in the body. The treatment in accordance with the present invention facilitates solutions of proteins in beverages, particularly carbonated beverages. As is known, splitting the insoluble proteins and raising of the pH to a strongly acidic condition, solubilize proteins; these treatments are secondary benefits that are enhanced by the increased solubility rendered by this process. By conducting the proteolysis at highly acid pH, it is possible to collodially suspend ordinarily soluble protein and to digest a large part of the colloidally dispersed protein. The remaining insoluble or dispersed protein lies in a quiescent state at the bottom of the vessel, thus avoiding the necessity of treating the already insoluble protein at the given pH.

Before specifically describing the process steps of the invention, the range of materials adapted to be treated and to be formed should be illustrated. The proteins which are intended to be treated are all plant globulins, i.e. simple proteins which yield only alpha-amino acids or their derivatives upon hydrolysis. Said simple proteins are more particularly those vegetable proteins, such as glycinin, which are derived from soybeans. However, the invention is adapted to treat all globulins derived from plants. Plants, of course, include not only vegetables but cereals such as corn, wheat, rye, male, and fruit kernels, etc. The invention will be described in terms of the treatment of soy proteins. The enzymes which may be used to treat the plant globulins are proteinases, i.e. those which are active in breaking the piptide bond, particularly those which are active at acid pH of 2 to 5 such as fungal proteinases, pepsin, or any other acid active enzyme. It is not intended to limit the invention to a specific enzyme nor to a specific protein since the invention lies in the process which enables one to produce a substantially completely acid soluble protein from an insoluble protein.

Referring more specifically to the process, it should be pointed out that the digestion medium provided is generally an aqueous dispersion of protein containing 3–6% protein in colloidal dispersion. Any suitable acid may be added to the aqueous dispersion to provide the acidic pH required for digestion. An example is a combination of 6 normal hydrochloric acid and concentrated phosphoric acid. The addition of the acid active enzyme is performed by stirring approximately 0.1%–1% based on the protein or 0.003%–0.03% based on the total slurry of the enzyme and allowing the reaction medium to settle. During digestion, quiescent conditions are maintained. Since the pH gradually rises during digestion, it is sometimes necessary to add acid to maintain a low pH. This pH adjustment is performed by periodically adding concentrated phosphoric acid or other acids to adjust the pH; adjusting to pH 2.7 is generally adequate. After sufficient time has elapsed for the colloidal protein to be digested and for the larger solids to settle out of solution and either before or after the digested protein slurry is cooled and centrifuged and the solid residue is discarded, a base is added to raise pH to 4.6. whereupon the mixture is then allowed to stand at temperatures varying from 0° C. to room temperature, depending on the protein molecule size in solution, for a period varying from 1–6 hours. Then the solution is filtered or centrifuged to remove the insoluble residue. The base can be any metal oxide or hydroxide of food quality but is preferably calcium oxide, NaOH, or $NH_4OH$. Divalent bases are preferred to form insoluble protein complexes that are more readily precipitated rather than the plain protein aggregates formed by monovalent bases. However, all such bases are useful herein. The soluble material is dried and renders a powdery product which is adapted for forming sparkling clear solutions at all pH's, indicating substantially complete solubility even at the isoelectric point of the starting material. Other methods of recovering the soluble matter are clearly adapted for use herein.

To further illustrate the invention, the following specific embodiments are presented by way of non-limiting examples.

EXAMPLE 1

(a) Approximately 100 g. of Nutrisoy 7–B (a commercially available soy protein flour) is extracted by mixing with about 20 times its weight in water at 96–100° F. for one hour with constant agitation. The resulting slurry is allowed to settle and is decanted. The solid residue is extracted by mixing with approximately 10 times its weight of water for one hour at 96–100° F. with no agitation. The resulting slurry is centrifuged and filtered and the solid residue discarded. The supernatant liquid from the first extraction and the second extraction are combined and hydrochloric acid is added to bring the pH of the liquid to 4.75. This liquid is centrifuged (filtering may be substituted here) and the supernatant liquid is discarded. The solid residue is washed twice with 10 times its weight in water and the washings are discarded. The washed solid residue is used to make a 3% solids aqueous slurry to which is added a mixture of 6 normal hydrochloric acid and concentrated phosphoric acid to bring the pH to 3.5.

(b) To the acid slurry is added 0.03% by weight based on the weight of the slurry of acid fungal proteinase with stirring. After settling the medium is left for a period of 2 days wherein the pH is periodically adjusted to about 2.7–4 by addition of concentrated phosphoric acid. The digestion medium is maintained in a generally quiescent state during the digestion period except during the acid additions and the originally present colloidal dispersion gradually is converted into a sparkling clear phase. After the 2 days, the digested protein slurry is cooled to about 15° C.

(c) Thereafter, the solution is centrifuged, and the solid residue is discarded.

(d) Then the supernatent liquid is converted by means of freeze drying into a powder product. Upon adding the powdered product to water and adjusting the pH to from 2.7 to 4.75, the proteinaceous material is substantially completely dissolved and forms a sparkling clear liquid when quantities up to 20% by weight of the soluble proteinaceous material are used.

EXAMPLE 2

After step (b) of Example 1, solid calcium oxide is added to the cool medium at 6° C. to bring the pH to 4.6 and the mixture is maintained for 6 hours.

Then steps (c) and (d) of Example 1 were repeated yielding a product with the same solubility characteristics as found in Example 1.

EXAMPLE 3

After step (c) of Example 1 solid NaOH is added to the cool medium maintained at 6–10° C. to bring the pH to 4.6 and the mixture is maintained for 6 hours.

Then step (d) of Example 1 was repeated with equivalent results.

EXAMPLE 4

Example 2 was repeated using a concentrated solution of $NH_4OH$ with equivalent results.

EXAMPLE 5

When a carbonated beverage is formed using the permanently soluble protein (P.S.P.) of this invention, a suitable formulation is prepared as follows:

Flavored carbonated protein drinks were prepared using permanently soluble protein (P.S.P.), produced by a variety of proteolytic enzymes. The following formulation was used:

| | G. |
|---|---|
| Cool ade (any flavor) | 1.4 |
| Sugar | 62.5 |
| Carbonated $H_2O$ | 500.0 |
| P.S.P. | 15.0 |

The P.S.P. can be added either before or after addition of the carbonated water. The mixture should be stirred gently, to prevent excessive foaming, until all the P.S.P. is dissolved.

The pH of the final solution will be between 2.5–3.0.

EXAMPLE 6

While carbonated beverages are referred to above as being the most common "acid" beverages it should be understood that the invention extends to non-carbonated "acid" beverages. One such beverage is an orange drink prepared as follows: 100 g. reconstituted orange juice, and 3 g. P.S.P. (permanently soluble protein).

The ingredients are combined in either order.

The mixture is stirred gently until all P.S.P. is dissolved. The final pH is between 3.0 and 4.0.

The above-noted examples clearly illustrate that the protein which is initially insoluble can be converted to a substantially completely soluble material by treatment according to the present invention. During the digestion process, it is desirable to avoid allowing the pH to rise above a point at which solubility occurs, this generally corresponding to the maximum pH at which the digested protein may be used, i.e. the isoelectric point of the starting materials. During digestion, the pH naturally rises due to formation of the protein-salts and concurrent consumption of acid, and additions of phosphoric acid are intended to maintain the reaction pH at the required value. If the digestion reaction is allowed to proceed to a point wherein the pH exceeds the isoelectric point, the resulting product has a bad taste and is incompletely soluble. One explanation is that the colloidal solubility of soy protein is lowest at an isoelectric pH (approximately 4.75 for Nutrisoy 7–B) and since it is desired to keep the colloidal sized protein dispersed for maximum digestion, it is desirable to avoid a pH of low solubility. It may further be desirable to maintain the pH of the reaction medium at approximately the pH which will be present in the beverage.

Another aspect of the process relates to the quiescent condition of the digestion medium during the digestion period. Initially, agitation is provided to mix the enzyme thoroughly throughout the dispersion, agitation is continued for a short period afterwards to ensure dispersion; however, the dispersion should be allowed to settle and should be maintained in a relatively quiescent state during the entire digestion period, except that some disruption occurs when acid is added. The material which is larger than colloidal size will thus be allowed to settle to the bottom and will be separated from the colloidal proteinaceous material which is intended to be treated by the process. A suitable time for digestion is 6 hours to 1 week preferably on the order of 1–2 days, for example, 15 to 20 hours. The time of digestion depends on the activity of the enzyme used and the temperature of digestion; generally long time periods over 4 days, for example, produce a bitter product with specific enzymes and are to be avoided, if possible. The concentration of enzyme based on the weight of the total mixture can range from 0.003 up to 0.03% by weight. Similarly, the concentration of the protein slurry treated may contain protein in quantities of from 3 to 6% by weight. The maximum efficiency is attained when the digestion medium is maintained at approximately 42° C. However, other temperatures may be utilized with a somewhat reduced efficiency when the enzyme used dictates other temperatures. Cooling after digestion is performed so as to precipitate insoluble material and avoid such precipitation from beverages formed from the protein when the beverages are refrigerated by the consumer. Cooling to temperatures from about −5 to 20° C. is sufficient.

Having described the invention in full, clear, and concise terms and having presented by way of non-limiting example secured by Letters Patent is:

What is claimed is:

1. The process for solubilizing insoluble plant proteins which comprises (a) forming a dispersion of said protein in an acid medium at pH below 4.6, adding an acid active enzyme, and allowing digestion to proceed until the insoluble colloidal protein is substantially completely dissolved in the reaction medium, allowing the reaction medium to settle and maintaining quiescent conditions during said digestion and (b) then raising the pH to about 4.6 and letting said medium stand whereby additional insoluble protein material is precipitated, and (c) drying the solubilized protein material.

2. The process of claim 1 wherein the plant protein is derived from soybean and it present in a quantity of from about 3 to 6% by weight.

3. The process of claim 1 wherein the reaction pH of (a) is maintained at above about 2.7 to below about 4.6.

4. The process of claim 1 wherein the enzyme used is active in acid pH of from 2 to 5.

5. The process of claim 1 wherein the time of reaction of (a) is from 15 to 48 hours and of (b) is 1–6 hours.

6. The process of claim 1 wherein the product from (b) is subjected to clarification and freeze drying.

7. The process of claim 1 wherein the temperature in (b) is from 0° C. to room temperature.

8. The process of claim 1 where step (b) is effected by adding a food quality base.

9. The process of claim 8 where the base is a divalent metal oxide or hydroxide.

10. A normally insoluble or partially insoluble plant protein modified by the process of claim 1.

11. The protein of claim 10 wherein said protein is derived from soybean and is completely soluble when present in an aqueous liquid in weight quantity of 3–10% weight.

12. A clear liquid containing a substantially completely dissolved modified plant protein of claim 10 at a pH corresponding to the isoelectric point of said protein.

13. The product of claim 12 wherein the liquid is carbonated.

References Cited

UNITED STATES PATENTS

| | | | |
|---|---|---|---|
| 2,473,255 | 6/1949 | Parfentjev | 99—14 |
| 3,126,286 | 3/1964 | Moshy | 99—17 |
| 1,218,190 | 3/1971 | Kummerlander | 99—79 |
| 2,489,173 | 11/1949 | Burnett et al. | 99—17 |
| 2,259,582 | 10/1941 | Perky et al. | 99—17 |
| 3,303,182 | 2/1967 | Sakai et al. | 99—17 |

OTHER REFERENCES

Markley: Soybeans and Soybean Products, vol. II pp. 725–726, 1951.

JOSEPH SCOVRONEK, Primary Examiner

S. B. DAVIS, Assistant Examiner

U.S. CL. X.R.

99—17, 28